US010191190B2

(12) United States Patent
Dodson et al.

(10) Patent No.: US 10,191,190 B2
(45) Date of Patent: Jan. 29, 2019

(54) SYNTHETIC DIAMOND OPTICAL MIRRORS

(71) Applicant: Element Six Technologies Limited, Oxfordshire (GB)

(72) Inventors: Joseph Dodson, Oxfordshire (GB); Yevgeny Vasilievich Anoikin, Santa Clara, CA (US); Daniel Twitchen, Oxfordshire (GB); Mark Robin McClymont, Berkshire (GB)

(73) Assignee: ELEMENT SIX TECHNOLOGIES LIMITED (GB)

( * ) Notice: Subject to any disclaimer, the term of this patent is extended or adjusted under 35 U.S.C. 154(b) by 0 days.

(21) Appl. No.: 15/102,778

(22) PCT Filed: Dec. 4, 2014

(86) PCT No.: PCT/EP2014/076501
§ 371 (c)(1),
(2) Date: Jun. 8, 2016

(87) PCT Pub. No.: WO2015/086419
PCT Pub. Date: Jun. 18, 2015

(65) Prior Publication Data
US 2016/0320534 A1 Nov. 3, 2016

Related U.S. Application Data

(60) Provisional application No. 61/913,565, filed on Dec. 9, 2013.

(30) Foreign Application Priority Data

Jan. 8, 2014 (GB) .................................. 1400264.6

(51) Int. Cl.
G02B 1/02 (2006.01)
G02B 5/08 (2006.01)

(52) U.S. Cl.
CPC .............. *G02B 5/0858* (2013.01); *G02B 1/02* (2013.01); *G02B 5/0891* (2013.01)

(58) Field of Classification Search
CPC ........ G02B 5/208; G02B 5/0891; G02B 1/14; G02B 5/282; G02B 5/0808; G02B 5/26;
(Continued)

(56) References Cited

U.S. PATENT DOCUMENTS 5,346,719 A * 9/1994 Zarnoch ............... C09K 3/1445
29/846
6,399,228 B1 * 6/2002 Simpson ............... B05D 5/065
359/360

(Continued)

FOREIGN PATENT DOCUMENTS

DE 102004060184 A1 * 6/2006 ............... G02B 1/10
DE 102004060184 A1 7/2006
(Continued)

OTHER PUBLICATIONS

DE 102004060184 A1 Original and machine translation dated Jun. 8, 2016.*
(Continued)

*Primary Examiner* — Thomas K Pham
*Assistant Examiner* — Sharrief I Broome
(74) *Attorney, Agent, or Firm* — Bryan Cave Leighton Paisner LLP

(57) ABSTRACT

A mirror for use in high power optical applications, the mirror comprising:
  a support plate comprising a synthetic diamond material; and
  a reflective coating disposed over the support plate,
  wherein the reflective coating comprises a bonding layer of carbide forming material which bonds the reflective coating to the synthetic diamond material in the support
(Continued)

plate, a reflective metal layer disposed over the bonding layer, and one or more layers of dielectric material disposed over the reflective metal layer, wherein the bonding layer and the reflective metal layer together have a total thickness in a range 50 nm to 10 µm with the reflective metal layer having a thickness of no more than 5 µm, and wherein the support plate and the reflective coating are configured such that the mirror has a reflectivity of at least 99% at an operational wavelength of the mirror.

13 Claims, 3 Drawing Sheets

(58) Field of Classification Search
CPC .......... G02B 5/085; G02B 5/281; G02B 1/10; G02B 1/105; G02B 5/08; G02B 5/0858; G02B 5/0816; G02B 5/0875; G02B 5/201; G02B 5/283; G02B 5/285; G02B 5/0866
USPC .......... 359/360, 359, 350, 585, 601, 485.01, 359/507, 883
See application file for complete search history.

(56) References Cited

U.S. PATENT DOCUMENTS

| | | |
|---|---|---|
| 6,508,561 B1 | 1/2003 | Alie et al. |
| 2011/0222178 A1 | 9/2011 | Bruchmann et al. |

FOREIGN PATENT DOCUMENTS

| | | |
|---|---|---|
| DE | 102012204833 A1 | 2/2013 |
| EP | 0280299 A2 | 2/1987 |
| EP | 0637638 A | 2/1995 |
| EP | 1717609 A1 | 11/2006 |
| EP | 2065734 A1 | 6/2009 |
| JP | S63208801 A | 8/1988 |
| JP | H06235806 A | 8/1994 |
| JP | H07171381 A | 7/1995 |
| JP | 2000304911 A | 11/2000 |
| JP | 2008257037 A | 10/2008 |
| WO | 2005022209 A1 | 3/2005 |

OTHER PUBLICATIONS

Claude A. Klein, "High-Power Laser-Mirror Faceplate Materials: Figures of Merit for Optical Distortion", SPIE vol. 3151.

* cited by examiner

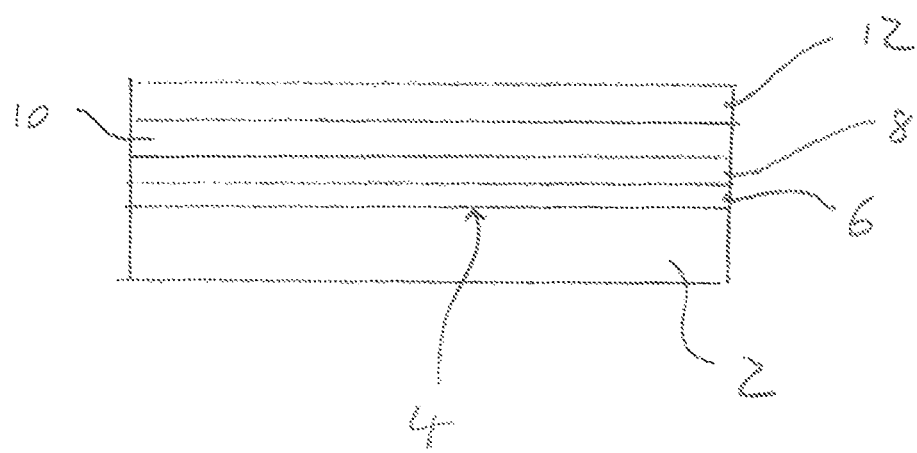
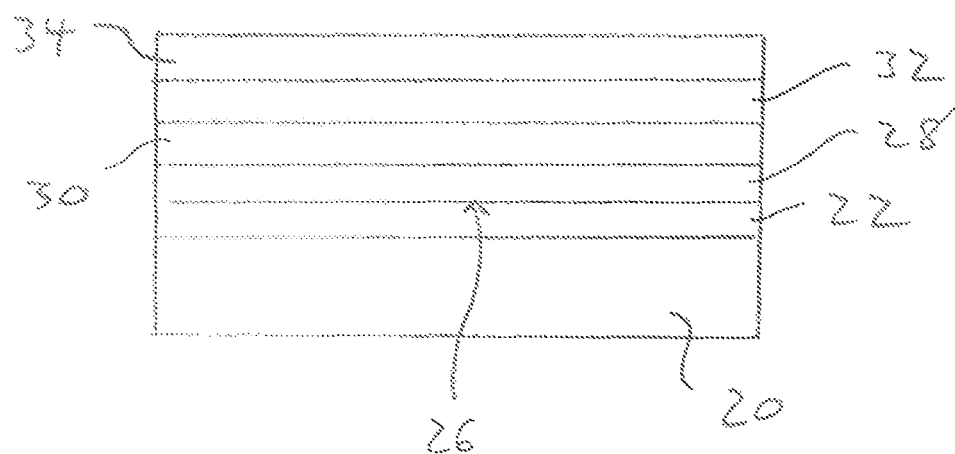

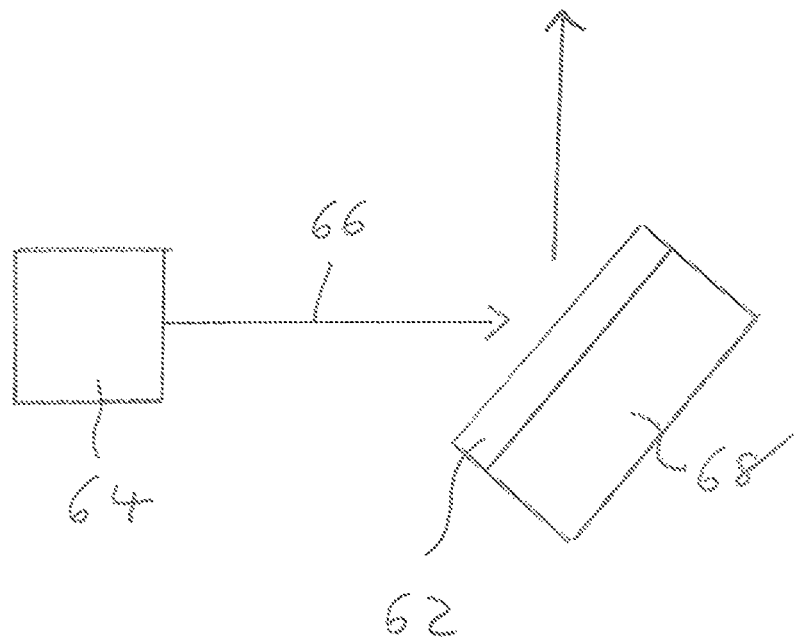

SYNTHETIC DIAMOND OPTICAL MIRRORS

FIELD OF INVENTION

The present invention relates to synthetic diamond optical elements and particularly to synthetic diamond optical mirrors. Particular embodiments relate to synthetic diamond optical mirrors having optical, thermal, and mechanical characteristics suitable for high power optical applications such as high power laser applications.

BACKGROUND OF INVENTION

To keep on track with the famous Moore's law, the next generation of EUV (Extreme UV) lithography has been committed to by major industrial players. Generating EUV is a complicated and inefficient process. For instance, 50 W EUV is currently generated using 20 kW infrared (IR) radiation at a wavelength of 10.6 µm. Efficiencies are expected to improve by up to 50% (i.e. 75 W EUV), but this still won't meet target values of up to 250 W or more. This means that even higher IR powers will be needed (40-50 kW) putting existing optical laser components such as mirrors, windows, and lenses under even more thermal stress. Typical optical systems for next generation EUV lithography comprise many mirrors (tens of mirrors per system) and typically each mirror has a diameter of 50 mm or greater.

To date, coated copper mirrors, such as gold coated copper mirrors, have been utilized, which are adequate for demonstrator systems but unlikely to be adequate for production systems. As such, there is a need to provide new mirror components which are suitable for use in such high power laser systems. The basic technical needs for such mirrors include the following:
- High flatness
- High stiffness
- Large areas (>50 mm)
- Low weight/density—since the mirrors need to be adjusted in adaptive optics systems, the density/weight of copper is an issue
- Optical tolerances of the order of lambda/10 or better where lambda is 10.6 µm
- Low coefficient of thermal expansion (CTE) to avoid thermal lensing type effects
- High thermal conductivity
- High laser induced damage threshold Claude A. Klein, "High-Power Laser-Mirror Faceplate Materials: Figures of Merit for Optical Distortion", SPIE Vol. 3151 discusses problems of thermal lensing in laser mirrors. Potential mirror-face plate materials are assessed from a theoretical stand-point using material characteristics to generate a figure of merit as a gauge for comparing thermal lensing performance of mirror material candidates in a pulsed or continuous wave laser environment. The figure of merit calculations indicate the following rating of potential laser mirror materials listed from worst to best: copper; molybdenum; silicon; silicon carbide; carbon-carbon (carbon fibre reinforced graphite); and diamond. It is indicated that copper still plays an important role as a mirror material for industrial $CO_2$-lasers but does not match the performance of other substrate materials when thermal lensing becomes an issue. Molybdenum exhibits a combination of physical properties that make it more attractive than copper, e.g. a lower thermal CTE, and is also easy to machine and polish. The two ceramics, silicon and silicon carbide, are good candidates for high energy laser applications. Finally, it is indicated that polycrystalline diamond and carbon-carbon composites are both outstanding candidates based on their thermal properties. However, there have been difficulties in adapting carbon-carbon composite fabrication techniques to cooled mirror configurations. Furthermore, while diamond exhibits particular promise for high-heat-load optics applications that require efficient cooling, there are some problems with using diamond for high energy laser mirrors. For example, large area diamond components are expensive to manufacture. Furthermore, while polycrystalline chemical vapour deposited (CVD) diamond material has the advantages of being very hard and stiff with a high thermal conductivity and a low thermal expansion coefficient, the material has relatively low toughness and is difficult to process to the high precision surface finishes required for mirror applications. Further still, it can be difficult to reliably bond reflective coatings to diamond substrate materials, particularly when components are exposed to high power lasers with thermal expansion coefficient mismatches leading to delamination problems. In addition, it is difficult to form polycrystalline CVD diamond to high thicknesses and/or into three-dimensional shapes, e.g. when curved mirrors are required.

It is an aim of embodiments of the present invention to address one or more of the aforementioned problems.

SUMMARY OF INVENTION

It is evident from the background section that while Klein suggests that diamond is a desirable substrate material for manufacturing reflective optics, Klein does not provide any specific guidance regarding several important factors for fabricating a diamond based reflective optic suitable for high power optical applications including:

(1) Klein is silent regarding the specific nature and form of the diamond material to be used as the mirror support plate and how the diamond-based mirror support plate is fabricated. Mechanical, thermal, and optical requirements of a diamond-based mirror will be dependent on the geometric form of the mirror support plate, the type of diamond material which is utilized, and how the diamond material is supported.

(2) Klein is also silent regarding suitable surface characteristics of the diamond-based mirror support plate and how these are achieved. Diamond materials are notoriously difficult to process to the high precision surface finishes required for mirror applications (e.g. high flatness or precise curvature in combination with low surface roughness and in combination with low surface and sub-surface crystal damage). This is due to the extreme hardness of diamond materials combined with low toughness. Optical characteristics such as reflectance and scatter will be dependent on the surface characteristics of the diamond based mirror support plate. Furthermore, thermal characteristics such as the thermal conductivity and thermal barrier resistance of a diamond-based mirror at an interface between a reflective coating and a diamond-based support plate will also be dependent on the surface characteristics of the diamond-based mirror support plate. Such characteristics will affect the laser induced damage threshold of the reflective optic for example.

(3) Klein is also silent regarding the nature of the reflective coating applied to the diamond-based mirror support plate and how it is adhered to the diamond-based mirror support plate. While various reflective coatings and bonding methods are known in the art for use with other mirror support plate materials such as copper, diamond materials are notoriously difficult to coat reliably due to the chemical inertness of a diamond surface and the low thermal expansion coefficient of diamond materials leading to a mismatch in thermal expansion coefficient between the diamond material and materials utilized to coat the diamond material. This is particularly problematic when reflective optics are exposed to high power lasers with thermal expansion coefficient mismatches in the coated reflective optic leading to thermally induced stresses causing delamination of the coating. As such, when using a diamond-based mirror support plate, the type of reflective coating and the way the coating is bonded to the diamond-based mirror support plate must be carefully selected to achieve industrially useful levels of reflection and, preferably, a high laser induced damage threshold.

The present specification addresses these issues by describing various combinations of features required to achieve a diamond-based reflective optic with the mechanical, optical, and thermal characteristics required for industrial applications such as next generation EUV lithography. A number of different embodiments are described herein which utilize a number of different combinations of materials, synthesis methods, surface processing techniques, and bonding methods to achieve the desired mechanical, optical, and thermal characteristics including various combinations of synthetic diamond materials, non-diamond support materials, synthesis methods, geometric forms of components, surface characteristics, surface processing methods of achieving desired surface characteristics, reflective coatings, methods of bonding reflective coatings, and methods of managing heat absorbed within the diamond-based reflective optic. All the embodiments share the common features of a diamond-based mirror support plate and a reflective coating disposed over the support plate, wherein a suitable combination of materials, layer thicknesses, synthesis, surface processing, and bonding methods are selected to provide a diamond-based mirror which has a high reflectivity and preferably a high laser induced damage threshold in pulsed laser and/or continuous wave laser operation.

In light of the above, according to the present invention there is provided a mirror for use in high power optical applications, the mirror comprising:
  a support plate comprising a synthetic diamond material; and
  a reflective coating disposed over the support plate,
  wherein the reflective coating comprises a bonding layer of carbide forming material which bonds the reflective coating to the synthetic diamond material in the support plate, a reflective metal layer disposed over the bonding layer, and one or more layers of dielectric material disposed over the reflective metal layer,
  wherein the bonding layer and the reflective metal layer together have a total thickness in a range 50 nm to 10 µm with the reflective metal layer having a thickness of no more than 5 µm, and
  wherein the support plate and the reflective coating are configured such that the mirror has a reflectivity of at least 99%, 99.2%, 99.4%, 99.6%, 99.7%, or 99.8% at an operational wavelength of the mirror and preferably a laser induced damage threshold meeting one or both of the following characteristics:
  the laser induced damage threshold is at least 1 Jcm$^{-2}$, 2 Jcm$^{-2}$, 5 Jcm$^{-2}$, 10 Jcm$^{-2}$, 20 Jcm$^{-2}$, 30 Jcm$^{-2}$, 50 Jcm$^{-2}$, 75 Jcm$^{-2}$, 100 Jcm$^{-2}$, 150 Jcm$^{-2}$, or 200 Jcm$^{-2}$ measured using a pulsed laser at the operational wavelength with a pulse duration of 100 ns and a pulse repetition frequency in a range 1 to 10 Hz; and
  the laser induced damage threshold is at least 1 MW/cm$^2$, 5 MW/cm$^2$, 10 MW/cm$^2$, 20 MW/cm$^2$, 30 MW/cm$^2$, or 50 MW/cm$^2$ measured using a continuous wave laser at the operational wavelength.

The operational wavelength may be 10.6 µm, 1.06 µm, 532 nm, 355 nm, or 266 nm, with a wavelength of 10.6 µm being particularly common for many high power industrial laser applications.

The bonding layer of carbide forming material provides a strong adhesion between the reflective coating and the synthetic diamond material in the support plate to alleviate problems of delamination of the reflective coating, particularly when subjected to high thermal loading in high power laser applications.

The bonding layer and the reflective metal layer together have a total thickness in a range 50 nm to 10 µm with the reflective metal layer having a thickness of no more than 5 µm such that the layers are sufficiently thick to achieve high reflectivity while being sufficiently thin that heat generated in the reflective metal layer is efficiently spread by the underlying diamond support plate.

The one or more layers of dielectric material disposed over the reflective metal layer aid in increasing the reflectivity of the mirror, ideally to well in excess of 99% reflectivity.

Detailed examples of mirror structures, materials, and fabrication methods for achieving diamond-based mirrors having the aforementioned characteristics are set out in the detailed description.

BRIEF DESCRIPTION OF THE DRAWINGS

For a better understanding of the present invention and to show how the same may be carried into effect, embodiments of the present invention will now be described by way of example only with reference to the accompanying drawings in which:

FIG. 1 shows a schematic diagram of a diamond-based high power laser mirror structure according to one embodiment;

FIG. 2 shows a schematic diagram of an alternative embodiment of a diamond-based high power laser mirror structure;

FIG. 5 shows a schematic diagram of a high power laser system comprising a diamond-based high power laser mirror structure.

DETAILED DESCRIPTION

Figure 3:
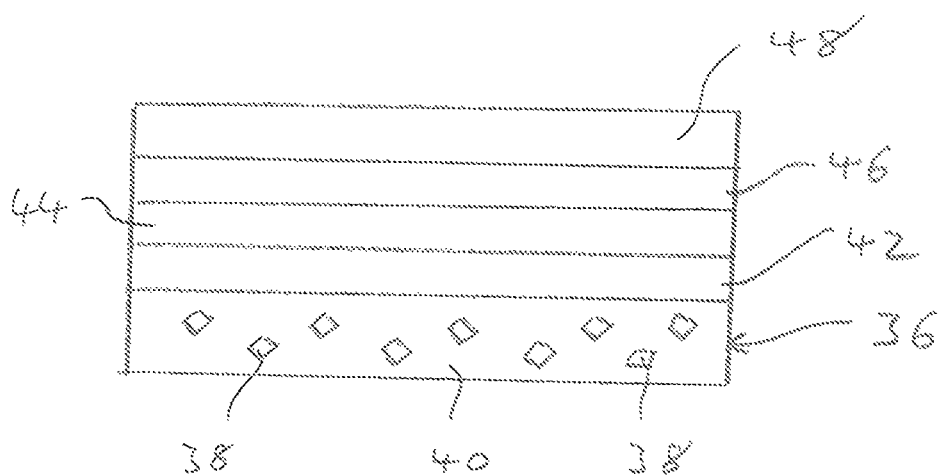
FIG. 3 shows a schematic diagram of another embodiment of a diamond-based high power laser mirror structure.

As indicated in the summary of invention section, embodiments of the present invention provide a mirror for use in high power optical applications, the mirror comprising:
  a support plate comprising a synthetic diamond material; and
  a reflective coating disposed over the support plate,
  wherein the reflective coating comprises a bonding layer of carbide forming material which bonds the reflective coating to the synthetic diamond material in the support plate, a reflective metal layer disposed over the bonding layer, and one or more layers of dielectric material disposed over the reflective metal layer, wherein the bonding layer and the reflective metal layer together have a total thickness in a range 50 nm to 10 µm with the reflective metal layer having a thickness of no more than 5 µm, and wherein the support plate and the reflective coating are configured such that the mirror has a reflectivity of at least 99%, 99.2%, 99.4%, 99.6%, 99.7%, or 99.8% at an operational wavelength of the mirror and preferably a laser induced damage threshold meeting one or both of the following characteristics:

the laser induced damage threshold is at least 1 Jcm$^{-2}$, 2 Jcm$^{-2}$, 5 Jcm$^{-2}$, 10 Jcm$^{-2}$, 20 Jcm$^{-2}$, 30 Jcm$^{-2}$, 50 Jcm$^{-2}$, 75 Jcm$^{-2}$, 100 Jcm$^{-2}$, 150 Jcm$^{-2}$, or 200 Jcm$^{-2}$ measured using a pulsed laser at the operational wavelength with a pulse duration of 100 ns and a pulse repetition frequency in a range 1 to 10 Hz; and the laser induced damage threshold is at least 1 MW/cm$^2$, 5 MW/cm$^2$, 10 MW/cm$^2$, 20 MW/cm$^2$, 30 MW/cm$^2$, or 50 MW/cm$^2$ measured using a continuous wave laser at the operational wavelength.

A basic three step methodology may be used to fabricate high power laser mirrors as described herein, the method comprising:

(i) fabricating a support plate comprising polycrystalline diamond material;
(ii) processing a surface of the support plate to a high precision optical finish; and
(iii) applying a reflective coating to the processed surface of the support plate.

Embodiments utilize a number of different mirror structures, materials, and fabrication methods for achieving mirrors having the aforementioned reflectivity and laser induced damage threshold characteristics. As outlined in the summary of invention section, important considerations include:

(1) the specific nature and form of the diamond material to be used as the mirror support plate and how the diamond-based mirror support plate it is fabricated;
(2) surface characteristics of the diamond-based mirror support plate and how these are achieved; and
(3) the nature of the reflective coating applied to the diamond-based mirror support plate and how it is adhered to the diamond-based mirror support plate.

The following detailed description will set out various options for dealing with each of these considerations.

Mirror Support Plate—Materials and Synthesis

Three basic possibilities exist for providing a mirror support plate comprising diamond material:

(1) a free-standing plate of synthetic diamond material;
(2) a layer of synthetic diamond material disposed on a support substrate; or
(3) a composite diamond plate comprising diamond particles distributed through a support matrix material.

A free-standing plate of synthetic diamond material may be provided in the form of single crystal HPHT or CVD synthetic diamond material or polycrystalline CVD diamond. For large area mirrors required in certain high power laser applications polycrystalline CVD diamond plates are preferred although large area single crystal CVD diamond plates may be provided by, for example, using a tiled substrate approach in which a relatively large area single crystal CVD diamond layer is grown over a plurality of single crystal diamond substrates configured in a tiled array.

If the mirror support plate is provided in the form of a free-standing plate of synthetic diamond material then the diamond material must be fabricated to be sufficiently mechanical robust to support the reflective coating and withstand thermal and mechanical stresses imparted on the mirror during fabrication, mounting, and in use. For example, one possibility is to provide a relatively thick wafer of high quality polycrystalline CVD diamond material which comprises well inter-grown micrometer scale diamond grains. A relatively high thickness is useful for a number of reasons: (i) it provides bulk polycrystalline CVD diamond material to support the mirror; (ii) it allows the mirror to be fabricated into a larger range of geometries; (iii) growth of thicker polycrystalline CVD diamond material can result in better inter-growth of larger micrometer scale diamond grains providing further mechanical support for the mirror; and (iv) it provides bulk polycrystalline CVD diamond material to spread heat generated during use in high power optical applications. For example, the thickness of the free-standing synthetic diamond plate may be no less than 200 µm, 400 µm, 600 µm, 800 µm, 1 mm, 1.5 mm, or 2 mm and/or no more than 3 mm, 2 mm, or 1.5 mm and/or within a range defined by any combination of these end points. For example, a thickness in a range 600 µm to 1.5 mm or 800 µm to 1 mm may be preferable for many reflective optics applications striking a balance between mechanical and thermal requirements and cost.

Furthermore, in addition to providing a free-standing synthetic diamond support plate which is relatively thick, it is also advantageous in some high power laser application to provide a free-standing synthetic diamond support plate which has a large area. In addition to geometric considerations, providing a large area diamond support plate also impacts thermal performance by enabling heat generated in use to be spread over a larger area and this reduce localized heating. For example, the support plate may have a largest linear dimension of at least 3 mm, 5 mm, 10 mm, 20 mm, 40 mm, 50 mm, 60 mm, 80 mm, 100 mm, 120 mm, or 140 mm. If the support plate is provided to have a circular shape in plan-view, which will usually be the case, then the largest linear dimension will correspond to the diameter of the support plate. Striking a balance between mechanical, thermal, and optical requirements and cost, for many optical applications the support plate may have a surface area (on the coated reflective side of the support plate) of at least 1963 mm$^2$, 2827 mm$^2$, 3848 mm$^2$, 5027 mm$^2$, 6362 mm$^2$, or 7054 mm$^2$ and/or no more than 15394 mm$^2$, 13273 mm$^2$, 11310 mm$^2$, or 9503 mm$^2$ (corresponding to a diameters of at least 50 mm, 60 mm, 70 mm, 80 mm, 90 mm, or 100 mm and/or no more than 140 mm, 130 mm, 120 mm, or 110 mm for a circular plate) and/or within a range defined by any combination of these end points.

By providing a well inter-grown micrometer scale polycrystalline CVD synthetic diamond support plate, it is possible to achieve a robust support plate with relatively high tensile rupture strength. For example, the polycrystalline CVD synthetic diamond support plate may have a tensile rupture strength with the working surface in tension of: ≥760 MPa×n for a thickness of 200 to 500 µm; ≥700 MPa×n for a thickness of 500 to 750 µm; ≥650 MPa×n for a thickness of 750 to 1000 µm; ≥600 MPa×n for a thickness of 1000 to 1250 µm; ≥550 MPa×n for a thickness of 1250 to 1500 µm; ≥500 MPa×n for a thickness of 1500 to 1750 µm; ≥450 MPa×n for a thickness of 1750 to 2000 µm; or ≥400 MPa×n for a thickness of ≥2000 µm, wherein multiplying factor n is 1.0, 1.1, 1.2, 1.4, 1.6, 1.8, or 2. Furthermore, the polycrystalline CVD synthetic diamond support plate may have a tensile rupture strength with the rear mounting surface in tension of: ≥330 MPa×n for a thickness of 200 to 500 µm;

≥300 MPa×n for a thickness of 500 to 750 µm; ≥275 MPa×n for a thickness of 750 to 1000 µm; ≥250 MPa×n for a thickness of 1000 to 1250 µm; ≥225 MPa×n for a thickness of 1250 to 1500 µm; ≥200 MPa×n for a thickness of 1500 to 1750 µm; ≥175 MPa×n for a thickness of 1750 to 2000 µm; or ≥150 MPa×n for a thickness of ≥2000 µm, wherein multiplying factor n is 1.0 1.1, 1.2, 1.4, 1.6, 1.8, or 2.

In addition to the above, it is also desirable to ensure that the surface of the diamond support plate to which the reflective coating is applied is formed of good quality diamond material which has low sp2 carbon content and a high thermal conductivity. In this regard, it is known that the sp2 content and the number and volume of voids in early stage nucleation diamond material is usually higher than latter stage growth of polycrystalline CVD diamond material with micrometer scale inter-grown diamond grains. As such, the thermal conductivity of diamond material at or near the growth face of a polycrystalline CVD diamond wafer is usually higher than the thermal conductivity of diamond material at or near the nucleation face of a polycrystalline CVD diamond wafer. Furthermore, it has been recognized that for high power mirror applications it can be advantageous to ensure that the diamond material which has the highest thermal conductivity is located proximal to the reflective coating to more efficiently spread heat generated at the reflective surface in use. As such, according to certain embodiments the diamond support plate is oriented such that a growth surface side of the polycrystalline CVD diamond plate is located proximal to the reflective coating and the nucleation surface side of the polycrystalline CVD diamond plate is located distal to the reflective coating, i.e. the reflective coating is applied to the growth face side of the diamond support plate rather than the nucleation face side. Since the grain size of polycrystalline CVD diamond material increases during growth then the diamond support plate is oriented such that the surface of the polycrystalline CVD diamond plate which is located proximal to the reflective coating comprises larger diamond grains than the surface of the polycrystalline CVD diamond plate which is distal to the reflective coating.

One problem with the aforementioned approach is that the growth surface side of a polycrystalline CVD diamond plate is usually very rough in as-grown form. As such, a significant amount of post-synthesis surface processing is required in order to provide a smooth surface finish have a precise flatness or curvature for mirror applications. This surface processing can be time consuming and thus add expense to the fabrication process. Furthermore, surface processing can introduce surface and sub-surface crystal damage into the diamond material which can adversely affect thermal and optical characteristics.

In contrast, the nucleation surface side of a polycrystalline CVD diamond plate, if grown on a smooth growth substrate, will have a smooth, low roughness surface finish in as-grown form. As such, less post-synthesis surface processing, or even no post-synthesis surface processing, may be required to achieve the desired surface finish prior to application of a reflective coating if the reflective coating is disposed on the nucleation surface side of the polycrystalline CVD diamond support plate. This can reduce post-synthesis processing requirements for a polycrystalline CVD diamond support plate thus reducing fabrication costs and reducing surface and sub-surface crystal damage caused by post-synthesis processing. However, as previously indicated, nucleation face diamond material tends to be of poorer quality than growth face diamond material with a higher sp2 carbon content, a higher void content, and a lower thermal conductivity, which is undesirable if this surface is to be located proximal to the reflective coating layer. As such, if the reflective coating is to be applied to the nucleation face side of the diamond support plate it is desirable to remove at least a portion of the worst quality nucleation face diamond material prior to application of a reflective coating. For example, a thin layer of nucleation face diamond material having a thickness of at least 50 nm, 100 nm, 200 nm, or 500 nm and/or no more than 20 µm, 10 µm, 5 µm, 2 µm, or 1 µm may be removed from the nucleation face side of the diamond support substrate prior to application of a reflective coating thereto. Alternatively, the early stage diamond growth can be controlled to improve the quality of the early stage diamond growth and reduce sp2 carbon content in the early growth stage diamond material. A number of methods are possible for achieving this. For example, the polycrystalline CVD diamond material may be grown using a methodology which comprises:

providing a substrate;
seeding a surface of said substrate;
growing a diamond nucleation layer on said surface using a chemical vapour deposition (CVD) technique; and
growing a thicker layer of polycrystalline CVD diamond material over the diamond nucleation layer,
wherein the method further comprises applying at least one of the following techniques:
(a) using a nanocrystalline diamond powder for the seeding step, the nanocrystalline diamond powder having an average particle size of no more than 200 nm and a D90 particle size of no more than 500 nm thereby reducing the size of grooves formed in the substrate surface and consequently reducing void formation during diamond growth thereon when compared with a seeding process which utilizes larger seed particles;
(b) using alternating CVD diamond growth and non-diamond carbon etch steps to fabricate the diamond nucleation layer, the technique comprising growing a diamond layer of a first thickness by chemical vapor deposition, etching at least a part of said diamond layer, repeating said steps of growing and etching at least a part of said diamond layer until an overall thickness of said diamond layer reaches a second thickness, wherein said step of etching at least a part of said diamond layer etches non-diamond phases preferentially over diamond phases thereby increasing the proportion of diamond phase in the diamond nucleation layer relative to non-diamond phases;
(c) using a pre-growth etching step applied to the substrate surface after seeding and prior to growth of the diamond nucleation layer thereon, wherein crystalline seeds are deposited on the substrate surface during seeding and the pre-growth etching step comprises etching using a chemistry which is selected to etch the substrate surface preferentially over crystalline seeds on the substrate surface and to smooth the substrate surface thereby reducing nucleation sites formed by sharp groove edges on the substrate surface relative to nucleation sites provided by the crystalline seeds.

The aforementioned techniques involve: increasing nucleation densities and reducing grooves in the substrate using fine nanoparticle seeding to reduce void formation and non-diamond carbon phases; using an alternating growth and etching procedure during early stage growth to reduce non-diamond carbon and increase grain size; and using a pre-growth etch selected to reduce nucleation on the substrate surface relative to the seeds to increase crystal domains and consequently diamond grain size during early stage growth. Advantageously these techniques can be used in combination with either two or all three techniques being applied together. For example, while a nanocrystalline powder can increase nucleation densities, reduce void formation and non-diamond carbon, and thus increasing thermal conductivity, if the nucleation density is too high then the crystal domain size can be reduced resulting in more grain boundaries which will reduce thermal conductivity. As such, techniques (a) and (c) may be applied in combination to allow a high but controlled nucleation to be provided allowing optimization of nucleation density versus crystal domain size while also lowering void formation, non-diamond carbon, and other defects. Technique (b) may then be used to further reduce the amount of non-diamond carbon during the early stages of polycrystalline CVD diamond growth and reduce the thickness of the nucleation layer before moving into a higher quality bulk polycrystalline CVD diamond growth phase.

A synthesis method for achieving a polycrystalline CVD diamond mirror support plate may thus be used which avoids, or at least reduces, the need for post-synthesis processing of the nucleation face of the as-grown polycrystalline CVD diamond material. Such a method may utilize a very flat, low surface roughness growth substrate and careful control of early stage diamond growth using seeding and early stage diamond growth techniques such as those described above to achieve good quality nucleation face diamond material. In this case, the nucleation face of the as-grown polycrystalline CVD diamond material may be sufficiently well formed that the requirement for surface processing of the nucleation face is reduced or eliminated after removal of the growth substrate and prior to application of a reflective coating. The growth substrate may have a surface flatness as measured over a length of 5 mm across the growth substrate of ≤5 µm, ≤4 µm, ≤3 µm, ≤2 µm, ≤1 µm, ≤0.5 µm, ≤0.2 µm, ≤or 0.1 µm. Furthermore, the growth substrate may have a surface roughness $R_a$≤20 nm, ≤10 nm, ≤5 nm, ≤2 nm, or ≤1 nm. Such a growth substrate may be formed, for example, of a carbide forming refractory metal substrate such as tungsten or a silicon wafer. The growth surface of the growth substrate is processed to a high degree of flatness and low surface roughness prior to diamond growth thereon. When used in combination with the seeding and early stage diamond growth processes as described previously a low sp2 diamond nucleation face can be achieved having a high degree of flatness and a low surface roughness. For example, a method of fabricating a polycrystalline CVD synthetic diamond support substrate as described herein may be provided, the method comprising:

growing a layer of polycrystalline CVD synthetic diamond material on a growth substrate, the layer of polycrystalline CVD synthetic diamond material having a nucleation face and a growth face, the nucleation face comprising smaller grains than the growth face, wherein the average lateral grain size of the growth face is no less than 10 µm;

wherein the growth substrate has a surface flatness ≤5 µm as measured over a length of 5 mm across the growth substrate and a surface roughness $R_a$≤20 nm;

wherein growth of the polycrystalline CVD synthetic diamond material is controlled such that after removal of the growth substrate the nucleation face of the layer of polycrystalline CVD synthetic diamond material has:

(a) smaller diamond grains than the growth face;
(b) an average lateral grain size in a range 10 nm to 15 µm; and
(c) a Raman signal generated by a laser focused on the processed nucleation surface which exhibits one or more of the following characteristics:
  (1) an sp3 carbon peak at 1332 $cm^{-1}$ having a full width half-maximum of no more than 8.0 $cm^{-1}$,
  (2) an sp2 carbon peak at 1550 $cm^{-1}$ having a height which is no more than 20% of a height of an sp3 carbon peak at 1332 $cm^{-1}$ after background subtraction when using a Raman excitation source at 633 nm; and
  (3) an sp3 carbon peak at 1332 $cm^{-1}$ is no less than 10% of local background intensity in a Raman spectrum using a Raman excitation source at 785 nm.

In relation to the above, it may be noted that whichever synthesis route is utilized for fabricating the diamond mirror support plate, the surface of the diamond mirror support plate which is disposed proximate to the reflective coating should preferably be formed of high quality diamond material which has a low sp2 carbon content, a low void content, and a high thermal conductivity. In this regard, Raman spectroscopy has been found to be a particularly useful technique for measuring sp2 carbon content in localized regions. Raman spectroscopy will typically use a 500 nm-1000 nm light wavelength which, when focused on a surface of diamond, will sample a surface volume of approximately 1 $\mu m^3$. Non-diamond carbon peaks include: 1580 $cm^{-1}$—graphite; 1350-1580 $cm^{-1}$—nanocrystallite graphite; and 1550-1500 $cm^-$—amorphous carbon and graphitic phases. It has been found that if non-sp3 bonded carbon is evident to any significant extent in a Raman spectrum of a synthetic diamond material then the material will have poorer thermal conductivity. Accordingly, preferably the sp2 carbon content is sufficiently low as to not exhibit any significant non-diamond carbon peaks in a Raman spectrum of the material at the surface of the diamond material which forms an interface with bonding and reflective layers.

The sp3 diamond Raman peak resides at approximately 1332 $cm^{-1}$. The width of the sp3 diamond Raman peak is known to be indicative of the crystal quality of the diamond material. According to certain embodiments, a Raman signal generated by a laser focused on a region of the surface of the diamond support plate on which the reflective coating is applied exhibits an sp3 carbon peak at 1332 $cm^{-1}$ having a full width half-maximum of no more than 8.0 $cm^{-1}$ 7.0 $cm^{-1}$, 6.0 $cm^{-1}$, 5.0 $cm^{-1}$, 4.0 $cm^{-1}$, 3.0 $cm^{-1}$, 2.5 $cm^{-1}$, or 2.0 $cm^{-1}$.

According to certain embodiments, using a helium-neon laser (633 nm) as the Raman excitation source focused on a region of the surface of the diamond support plate on which the reflective coating is applied produces a diamond Raman spectrum with an sp2 carbon peak at around 1550 $cm^{-1}$ which is no more than 20%, 10%, 5%, 1%, 0.1%, 0.01%, or 0.001% of the height of the sp3 diamond Raman peak residing at around 1332 $cm^{-1}$ after background subtraction. The amount of sp2 carbon may alternatively be assessed by measuring the height of the sp3 diamond Raman peak residing at approximately 1332 $cm^{-1}$ relative to the height of the local background to that peak which is due to impurities such as sp2 carbon. According to certain embodiments, using a Raman excitation source at 785 nm focused on a region of the surface of the diamond support plate on which the reflective coating is applied produces a diamond Raman spectrum with an sp3 carbon peak at approximately 1332 cm$^{-1}$ which is no less than 10%, 20%, 30%, 40%, 50%, 60%, or 70% of the local background intensity in the Raman spectrum.

Suitable free-standing wafers of polycrystalline CVD synthetic diamond material suitable for use as mirror support plates are available from Element Six Limited. A variety of grades of polycrystalline CVD synthetic diamond material are available including mechanical grades, thermal grades, and optical grades. The specific grade of polycrystalline CVD synthetic diamond material selected for the mirror support plate will depend on the specific application and can be selected according to mechanical, thermal, and optical requirements. However, for high power laser applications it is desirable to select a grade of material which has a high thermal conductivity to alleviate problems of localized heating and thermal deformation and damage. As such, optionally a synthetic diamond material is selected which has a thermal conductivity of at least 1000 Wm$^{-1}$K$^{-1}$, 1200 Wm$^{-1}$K$^{-1}$, 1400 Wm$^{-1}$K$^{-1}$, 1600 Wm$^{-1}$K$^{-1}$, 1800 Wm$^{-1}$K$^{-1}$, 1900 Wm$^{-1}$K$^{-1}$, 2000 Wm$^{-1}$K$^{-1}$, 2100 Wm$^{-1}$K$^{-1}$, or 2200 Wm$^{-1}$K$^{-1}$. Single crystal synthetic diamond materials are also available from Element Six Limited which meet or exceed these thermal conductivity characteristics although these are generally available in smaller sizes compared to polycrystalline CVD synthetic diamond wafers. That said, as previously indicated, one known route to increase the size of single crystal CVD diamond components is to use a tiled substrate approach in which a relatively large area single crystal CVD diamond layer is grown over a plurality of single crystal diamond substrates configured in a tiled array.

While the aforementioned description provides a detailed discussion of suitable free-standing synthetic diamond plates for use as a mirror support plate, as previously indicated it is also possible to provide a mirror support plate which comprises a layer of synthetic diamond material disposed on a non-diamond support substrate or to provide a composite diamond support plate comprising synthetic diamond material (e.g. diamond particles) disposed with a support material. Such composite solutions combine a synthetic diamond material with a non-diamond support material and a reflective coating. One advantage of such composite mirror support plates is that it is possible to retain, at least to some degree, many of the advantageous thermal characteristics of diamond material while also achieving a lower cost, large area, and optionally curved mirror configuration suitable for high power laser applications.

In light of the above, according to certain configurations the synthetic diamond material may be disposed within a support material to form a diamond composite support plate on which a reflective coating is disposed. For example, the diamond composite support plate may be formed of silicon cemented diamond (ScD) which has good thermal characteristics while also being more easily formable into large areas and three-dimensional shapes when compared with a polycrystalline CVD diamond wafer.

Alternatively, polycrystalline CVD diamond material may be provided in the form of a polycrystalline CVD diamond layer disposed on a support substrate formed of the support material. This solution allows large area, thin coatings of polycrystalline CVD diamond material to be provided as opposed to relatively thick, free-standing polycrystalline CVD diamond mirror support plates.

One useful configuration is to combine this layered substrate approach with the use of a diamond composite material. For example, the mirror support plate can be formed of ScD with a polycrystalline CVD diamond coating which is surface processed to a precise optical finish and coated with a reflective coating. In this regard, ScD coated with polycrystalline CVD diamond material has previously been proposed as a heat spreader for electronic device substrates (see, for example, WO2004/034466). Here it is proposed that such a composite material structure may be polished to a precise optical finish and coated with a reflective coating to form a mirror suitable for high power laser applications.

As an alternative to the above, it is also envisaged that other support substrates may be coated with polycrystalline CVD diamond material or bonded thereto, polished to a precise optical finish, and coated with a reflective coating to form a mirror suitable for high power laser applications. Examples of suitable support substrates include silicon carbide, silicon, and thermal pyrolytic graphite (TPG).

Methods of fabricating silicon cemented diamond (ScD) support plates are known in the art. For example, see WO99/12866, WO00/18702, WO02/42240, WO2004/089850, and WO2009/013713. A method of fabricating a composite support substrate comprising ScD material with a polycrystalline CVD diamond coating is described in WO2004/034466. Polycrystalline CVD diamond coatings can also be grown directly on silicon, silicon carbide, or thermal pyrolytic graphite support substrates, typically seeding the support substrate prior to diamond growth. These methods are known to those skilled in the art. The substrate is normally maintained at a growth temperature in the range 600-1200° C. during CVD diamond growth with temperature and gas composition chosen to obtain the desired cost and quality of synthetic diamond material.

Less well known are the extra considerations for coating these substrates and obtaining a useful mirror after processing of the diamond material. The thermal expansion mismatch between the diamond film and substrate needs to be considered as it influences the surface form of the diamond after it has cooled from the growth temperature to room temperature. The stiffness of the substrate can be adjusted by changing its thickness and/or its geometry. The shape change on cool down depends on the relative stiffness of the substrate and the synthetic diamond layer (dependent on diamond layer thickness) and the growth temperature for a substrate with a given thermal expansion coefficient. The final shape of the composite mirror can be influenced by the shape of the growth substrate prior to diamond coating, any shape change on cooling after diamond growth, and any post-growth processing.

A thickness of the growth substrate will normally be between 2 mm and 20 mm. The largest linear dimension of the growth substrate will normally be at least 10 mm, 20 mm, 40 mm, 60 mm, 80 mm, 100 mm, 120 mm, or 140 mm. A surface profile of the substrate may have a surface roughness $R_a$ of at least 15 nm, 25 nm, 50 nm, 100 nm, 200 nm, 500 nm, or 1 micrometer in order to aid adhesion of the diamond layer to the substrate when it is desired to fabricate a diamond coated substrate in which the diamond coating is well adhered to the substrate.

In the case of a thick growth substrate, made from materials which have a relatively low difference in thermal expansion coefficient to diamond, and a thin layer of synthetic diamond material grown thereon, the substrate will be relatively stiff. In this case, after coating the substrate with polycrystalline CVD diamond material it is possible to achieve a well-defined surface profile. For example, the surface profile may have a root mean square deviation from a smooth target surface profile (e.g. flat or precisely curved), said root mean square deviation being no more than 10 micrometer, 8 micrometer, 6 micrometer, 4 micrometer, 2 micrometer, or 1 micrometer. In the case of a thin growth substrate, optionally being made from materials with a relatively high difference in expansion coefficient to diamond, and a thick layer of synthetic diamond material grown thereon, the substrate will be relatively deformable. Therefore the shape of the diamond coated substrate will be dominated by thermally induced deformation following cooling from the diamond growth temperature, and the surface profile of the diamond coated substrate may differ significantly from a target surface profile for the final composite mirror. Such a diamond coated substrate may thus require significant post-synthesis surface processing to achieve the desired surface profile prior to application of a reflective coating.

It is further proposed here that as an alternative to growing CVD diamond directly onto support plate materials to form a diamond coated mirror support plate as described above, it is possible to bond polycrystalline CVD diamond material to a support plate to form a mirror support plate. The bonding may comprise a brazed or soldered join. The diamond and support material can optionally both be metallised prior to bonding. Examples of suitable brazes for joining diamond to other materials include active carbide formers such as TiCuSil or Au—Ta. Solders can include InSn. In the case of a solder, the diamond material will normally be metallised prior to soldering. The final shape of the composite mirror will be influenced by the material and geometry of the substrate, as well as the thickness of the diamond. Furthermore, the final shape of the composite mirror may be affected by the temperature applied during the bonding process as this will determine the level of thermal deformation due to expansion coefficient mismatch between the diamond and support material. The thickness of the joining material can also influence the final shape of the composite by potentially offering a thick compliant layer to reduce total deformation, or a thin, minimally compliant layer to enforce the stiffness of one component part onto the overall shape of the composite substrate.

Once a mirror support plate has been fabricated according to one or more of the options described above, a surface of the mirror support plate can be processed to a high precision optical finish as described in the next section.

Mirror Support Plate—Post-Synthesis Processing and Surface Characteristics

In order to achieve high reflective optics performance with high reflectivity and little optical beam aberration or light scatter, the surface of the mirror support plate may be very precisely processed to a smooth target profile. For example, the support plate may have a largest linear dimension of at least 3 mm, 5 mm, 10 mm, 20 mm, 40 mm, 60 mm, 80 mm, 100 mm, 120 mm, or 140 mm and a surface profile with a root mean square deviation from a smooth target surface profile of no more than 100 nm, 80 nm, 60 nm, 40 nm, 20 nm, 15 nm, 10 nm, or 5 nm. In addition, the surface profile of the support plate may have has a surface roughness $R_a$ of no more than 20 nm, 15 nm, 10 nm, 5 nm, 3 nm, or 1 nm. Depending on application requirements the smooth target surface profile may be a perfectly flat, convex, or concave surface. The term "surface roughness $R_a$" (sometimes referred to as "centre line average" or "c.l.a.") refers to the arithmetic mean of the absolute deviation of surface profile from the mean line measured, for example, by stylus profilometer over a length of 0.08 mm according to British Standard BS 1134 Part 1 and Part 2.

It should be noted that diamond materials are notoriously difficult to process due to their high hardness and low toughness. Any processing method must be sufficiently aggressive to overcome the extreme hardness of the diamond based support plate while at the same time must not impart a large degree of stress or thermal shock to the material which would cause macroscopic fracturing of the material due to its brittle nature and low toughness. Furthermore, for high power optical applications it is important that surface and sub-surface damage at a microscopic scale, such as microcracking, is minimized to avoid deterioration of functional properties which may result from such surface and sub-surface damage including, for example, optical scattering, increased optical absorption, decreased thermal conductivity, and a decrease in the laser induced damage threshold.

A multi-step surface processing technique may be utilized for processing diamond based mirror support plates to a high degree of precision for high power laser mirror applications as described herein. The method comprises:

(a) forming a surface of the diamond based mirror support plate to have a first surface profile within a first root mean square deviation from a smooth target surface profile, said first root mean square deviation being no more than 5 µm;

(b) analysing said surface of the diamond based mirror support plate to detect a plurality of protruding regions on said surface; and (c) selectively processing over only the protruding regions on the surface of the diamond based mirror support plate to form a second surface profile within a second root mean square deviation from the smooth target surface profile, said second root mean square deviation being less than 100 nm, 80 nm, 60 nm, 40 nm, 20 nm, 15 nm, 10 nm, or 5 nm.

The aforementioned method is based on the finding that it is very difficult to process a surface of a diamond based mirror support plate to have a surface profile with a root mean square deviation of significantly less than 1 µm from a smooth target surface profile in a reliable, consistent, time efficient, and cost effective manner. Typically, diamond materials are processed using lapping and polishing techniques, each of which process one entire surface simultaneously. However, while finer and finer abrasive particles can be used to move towards more precise surface finishes, chipping, cracking, and/or thermal induced warping of the diamond based mirror support plate means that there is no guarantee that a highly precise target surface profile will be achieved, even after many days of processing.

In light of the above, one possibility is to analyse the surface of the diamond based mirror support plate to detect deviations from a target profile and then selectively process individual regions, rather than the entire surface, such that differential targeted processing is utilized to achieved the desired surface profile. Such a method is more controllable, reliable, and consistent at achieving a highly precise surface finish as the processing of individual selected regions requires less energy, lower applied forces, and generates less heat. This methodology has been found to provide a reliable, consistent, time efficient, and cost effective route to achieving high precision surface finishes for diamond based mirror support plates.

The exact level of precision required for the initial surface preparation and the final surface after selective processing will depend to some extent on the specific processing techniques used to generate the surfaces at the various stages of processing and the required level of precision for a particular end application. For example, the initial surface profile may be prepared to have a root mean square deviation from a smooth target profile which is no more than 3 µm, 1 µm, 500 nm, 100 nm, 50 nm, 20 nm, or 10 nm. The root mean square deviation of this initial surface profile may also be no less than 5 nm, 10 nm, or 15 nm. The final surface profile after selective processing may be prepared to have a root mean square deviation from the smooth target profile which is no more than 100 nm, 80 nm, 60 nm, 40 nm, 20 nm, 15 nm, 10 nm, or 5 nm.

In the above discussion the flatness of a surface profile has been defined in terms of root mean square deviation from a smooth target profile. In optical applications, flatness is often defined in terms of the operating or reference wavelength $\lambda$. For example, for certain optical applications a flatness specification of no more than $\lambda/10$ or more preferably $\lambda/20$ is desirable (i.e. no more than 60 nm or more preferably no more than 30 nm for $\lambda=532$ nm). This level of flatness requires non-standard processing including, for example, optimized mounting for lapping and polishing, control of thermal distortions via low temperature and low pressure polishing, and/or via use of non-flat polishing wheels to account for thermal deformations, and/or post-polishing identification of protruding regions which are selectively processed back after polishing as described above. New low temperature surface processing techniques such as chemo-mechanical polishing (CMP) may also be useful.

It can also be desirable to provide a surface finish which has a low surface roughness in addition to a high degree of flatness or a precisely defined curvature. In practice, it has been found that certain selective processing techniques can lead to an increase in microscopic surface roughness. That is, while macroscopic flatness or curvature is improved by the selective processing, microscopic roughness is actually increased by selective surface processing relative to the initially prepared surface prior to application of selective processing. Accordingly, where a low surface roughness is desirable in combination with a higher degree of flatness or a precisely defined curvature then it is advantageous to prepare the initial surface to have a very low surface roughness. As such, despite a small increase in roughness due to selective processing the diamond based mirror support plate will still retain a relatively low roughness surface for reflective optics applications. Further still, it is advantageous to apply a selective processing technique which does not unduly increase the surface roughness of the super-hard material. By ensuring that the initial surface is already within a specified flatness or curvature the level of selective processing to achieve the final surface profile is lower and thus the increase in surface roughness can be made lower. The exact surface roughness will depend on the specific surface processing techniques which are utilized and the surface roughness which is desired for a particular end application. For example, after selective processing, the surface of the diamond based material may have a surface roughness $R_a$ of no more than 20 nm, 15 nm, 10 nm, 5 nm, 3 nm, or 1 nm.

The surface processing methodology as described herein is capable of generating highly flat or precisely defined curved surface over large areas of diamond based material in a reliable, consistent, time efficient, and cost effective manner.

A number of different surface processing techniques may be used to generate the initial surface profile prior to application of selective surface processing. Processing techniques include one or more of: direct growth; cutting; lapping; polishing; chemo-mechanical polishing; ablating; electric discharge machining; and etching.

While for certain growth processes it is possible to generate a sufficiently well-defined surface to function as the starting surface for selective processing, in practice as-grown diamond based materials will usually be cut, lapped, and then polished to generate the surface to which selective processing is then applied.

Cutting is usually achieved using a laser although other cutting techniques such as electron beam cutting can be used. Further still, if the diamond based material is electrically conductive it may be cut using electric discharge machining.

Lapping is them performed to generate an approximate surface profile. In a standard lapping process a diamond based material is mounted on a rotatable processing wheel. An abrasive slurry comprising super-hard abrasive particles (e.g. diamond grit) within a carrier fluid is dripped onto the surface of the processing wheel from above. Generally, the abrasive slurry is dripped onto the processing wheel near a central region thereof and the abrasive slurry moves radial outwards across the processing wheel during rotation of the processing wheel in use. For a rough lapping process where a significant amount of material is to be removed from a surface of the diamond support plate, the super-hard abrasive particles may be relatively large in size, e.g. having a particle size of greater than 1 µm. These abrasive particles are larger than pores within the surface of the processing wheel and thus roll between the surface of the processing wheel and the surface of the super-hard material within an interface region in order to cause surface micro-cracking of the diamond-based mirror support plate and removal of material from the surface of the diamond-based mirror support plate.

One problem with the aforementioned lapping configuration is that the lapping process can be difficult to control in order to achieve high rates of material processing without causing undue damage to the surface of the diamond-based mirror support plate being processed. Furthermore, another problem with the aforementioned lapping configuration is that the lapping process is difficult to control in order to obtain uniform processing across a large area mirror support plate. To solve this problem it is possible to provide a processing plate adapted to provide a plurality of feed ports disposed in the surface thereof such that in use an abrasive slurry is fed through the feed ports onto the surface of the processing wheel from underneath the processing wheel. The plurality of feed ports can be radially distributed across the surface of the processing wheel such that at least a portion of the abrasive slurry is fed directly from the feed ports into the interface region between the surface of the processing wheel and the surface of the mirror support plate being processed.

Surprisingly, it has been found that higher rates of material processing can be achieved in a much more controllable manner using a lapping configuration in which the surface of the processing wheel has one or more feed ports disposed therein and the abrasive slurry is fed through the feed ports during processing of the mirror support plate onto the surface of the processing wheel from underneath the processing wheel rather than dripped onto the surface of the processing wheel from above as is done in a more standard lapping configuration. A better surface finish is also achieved, especially for large mirror support plates when compared with a top feed approach.

After lapping, the diamond based mirror support plate can be polished and this is particular desirable when a low surface roughness is required. Polishing is a two-body surface processing technique in which abrasive material is fixed in a polishing wheel such as via resin bonding. Polishing may also be achieved using an iron or steel wheel which is diamond impregnated and this is known as scaife polishing. Although scaife polishing generally utilizes free diamond abrasive particles these are of a small size relative to pores within the iron or steel wheel and are thus embedded/fixed into the wheel thus effecting a two-body processing as opposed to a true three body lapping process. If a dry polishing technique is utilized on a diamond based material this can generate a significant amount of heat which can introduce thermal stress and warping of the diamond based support material. Accordingly, the polishing parameters may be controlled, e.g. by utilizing a low pressure polishing technique, to alleviate heat generation and avoid such thermal warping when a precisely defined surface flatness or curvature is desired in accordance with embodiments of the present invention. Additionally, or alternatively, the polishing wheel may be shaped to compensate for thermally induced stresses produced during polishing. For example, a slight curvature may be introduced into the polishing wheel such that when the processed mirror support plate is removed after polishing, thermally induced stress causes the polished mirror support plate to be pulled into a flat configuration. Alternatively still, a lower temperature wet polishing technique such as a chemo-mechanical polishing technique may be utilized to avoid thermally induced stress and warping of the mirror support plate away from a desired smooth target profile. Chemo-mechanical processing (CMP) techniques combine mechanical and chemical processing mechanisms utilizing CMP slurries including abrasive grit particles and chemical components which react with the surface of the diamond material being processed to change the chemical composition of the surface making it easier to remove.

As an alternative, or in addition to the aforementioned lapping and polishing techniques, the diamond based support plate may be processed using an etching technique such as plasma etching using suitable gas chemistries including, for example, one or more of hydrogen, oxygen, argon (or other inert gases), and chlorine (or other halides). An example of an etching technique for achieving low surface roughness diamond surface finishes is described in WO2008/090511.

After preparing a surface of the diamond based support plate by, for example, lapping and polishing as described above, the surface can be analysed to detect any protruding regions on said surface. For example, the optical industry standard method to measure flatness and roughness is by interferometry at 632.8 nm. This method can also be used to produce a topographic map of the surface of the support plate to detect any protruding regions on said surface.

After detection of protruding regions as described above, these protruding regions can be selectively processed back. Selective processing may be achieved by one of: a focused beam such as a laser beam, an electron beam, or a focused ion beam; a targeted electric discharge; a masked etch; or a mechanical or chemo-mechanical polishing pad which is smaller in area than the surface of the mirror support plate being processed such that selective processing over only protruding regions on the surface of the mirror support plate is achieved.

As previously described, while selective processing techniques can lead to an improvement in surface flatness or a more precisely defined curvature, they can also lead to an increase in microscopic surface roughness which is undesirable for certain applications. Methods of alleviating this problem have previously been described involving the provision of an initial surface profile which has a very low surface roughness and controlling the selective processing such that the surface roughness is not increased beyond the required roughness specification for a particular application. An alternative or additional option for achieving a low roughness surface in combination with a high flatness or precisely defined curvature involves applying a further non-selective surface processing technique to the surface of the super-hard material after selective processing to reduce surface roughness while retaining a surface within the desired flatness or curvature requirements. This final processing stage may comprise a light polishing step to reduce surface roughness without causing a significant deviation from the macroscopic surface profile generated by the selective processing. If required, two or more iterations of selective surface processing and full surface processing can be performed to achieve the desired levels of low roughness in combination with a high flatness or precisely defined curvature.

After the above described surface processing techniques have been performed a cleaning step may also be applied. For example, an acid clean may be applied to remove any metal, resin, or non-diamond carbon from the processed surface.

Once the support plate has been processed to a high precision optical finish as described above it may be coated with a reflective coating as described in the next section.

Reflective Coatings

The reflective coating is required to provide a surface which reflects the majority of light at an operational wavelength. For example, the reflective coating may be configured to have a reflectivity of at least 99%, 99.2%, 99.4%, 99.6%, 99.7%, or 99.8% at an operational wavelength of the mirror, wherein the operating wavelength is selected from one of: 10.6 μm; 1.06 μm; 532 nm; 355 nm; or 266 nm. Furthermore, given that a small proportion of energy will generally be absorbed in use leading to a large increase in temperature, the coating must be well adhered to the underlying diamond composite support substrate with a bonding which is thermally stable to avoid delamination of the reflective coating. Examples of suitable coatings include metal coatings such as gold. In order to ensure that such a metal coating is well adhered to an underlying diamond based material, the reflective coating can be formed of a multi-layer coating comprising a carbide forming layer, an optional barrier layer, and a reflective layer. An example of such a multi-layer coating comprises a titanium-platinum-gold multilayer structure.

In contrast to coating of, for example, metals onto metal substrates, coating of diamond support plates with a metal film that will be suitably resistant to the demands of a high power laser system needs more specialised techniques than, say, simple evaporation. A strong bond needs to be formed between the diamond and the metal. Typically this can be achieved using a carbide forming metal such as tungsten, chromium, or titanium, either deposited by an energetic method such as magnetron sputtering, or by a less energetic method such as evaporation, followed by an anneal cycle at a sufficiently high temperature to cause a bonding reaction. Subsequent layers of other metals can then be deposited by appropriate techniques, using interlayers to reduce metal diffusion where necessary, until the required thickness of the final metal has been applied.

For optimal reflection in the infra-red region of the electromagnetic spectrum, the final outer metal coating will normally be selected from one of Au or Ag. Other metals which are also used to achieve a reflectance in excess of 98% in their bare, pristine state at wavelengths around 10 micrometer include Al, Mo, Cu, Ni, Rh, and W. However, none of these metals are capable of achieving significantly in excess of 99% reflectance.

Typically, the reflective coating will thus comprise at least two coating layers including: a bonding layer proximate to the diamond support plate and formed of a material selected to provide a strong bond to the diamond support plate; and a reflective layer distal to the diamond support plate and formed of a material selected to provide a high degree of reflectivity at the operational wavelength of the mirror. Optionally, a barrier layer may also be provided between the bonding layer and the reflective layer to reduce metal diffusion. An example of such a barrier layer is platinum. All these layers may be metallic. Additionally, a dielectric coating can be provided over the reflective metal layer to further increase reflectivity.

The reflective metal layer has a thickness of no more than 5 μm may have a thickness of no more than 3 μm, 1 μm, 500 nm, or 300 nm and no less than 50 nm, 100 nm, 150 nm, or 200 nm. Furthermore, the reflective layer may be formed of Au, Ag, Al, Mo, Cu, Ni, Rh, or W. If tungsten is used for the reflective layer then this may also form the bonding layer of carbide forming material which bonds to the synthetic diamond material in the support plate. Otherwise different materials will be selected for the bonding and reflective layers. If the reflective coating is too thick then the benefits of providing diamond material in the mirror support substrate are reduced. This is why the underlying diamond support substrate should be processed to a precise optical surface finish. That is, while a thick reflective coating could be applied to a diamond mirror support plate and processed to compensate for non-uniformities in the surface profile of the diamond mirror support plate, such a thick reflective coating would reduce the thermal performance of the mirror which is a key functional goal of embodiments of the present invention.

The carbide forming material of the bonding layer will usually be a carbide forming metal material such as W, Cr, or Ti. The bonding layer may have a thickness of no more than 500 nm, 250 nm, 150 nm, or 100 nm and no less than 10 nm, 20 nm, or 50 nm. The thickness of this layer is selected to provide a strong bonding to the underlying synthetic diamond support plate while being sufficiently thin that it does not provide an undue barrier to heat flow from the reflective metal layer into the support plate.

The reflective coating may further comprise an optional barrier layer (e.g. platinum) provided between the bonding layer and the reflective metal layer. If present, the barrier layer may have a thickness of no more than 500 nm, 250 nm, 150 nm, or 100 nm. The barrier layer may be made sufficiently thick to prevent diffusion and adverse reactions between bonding and reflective metal layers while being sufficiently thin to allow for efficient heat spreading into the synthetic diamond support plate.

The typical thickness of coating layers for high power laser mirror applications is as follows: a bonding layer (e.g. a carbide forming metal such as Cr or Ti) of 50-250 nm thickness; an optional barrier layer (e.g. platinum, which is particularly of use in combination with a Ti bonding layer but is not required for a Cr bonding layer which is more stable) of 0-250 nm thickness; and a final reflective metal layer (e.g. Au or Ag) of at least 100 nm or 200 nm to 500 nm thickness (depending on the metal) in order to achieve high reflectivity and optical independence from any underlying layers. The coating should not be so thick that heat generated in use within the coating is significantly spaced from the underlying diamond material in order to ensure that heat is efficiently spread by the diamond material.

While thin metal coatings can be made to be conformal to the underlying diamond support plate and therefore replicate its form and flatness, it may be desirable to deposit a slightly thicker metal coating than is necessary for solely reflectivity reasons. For example, with a final metal layer of Au, 200 nm is sufficient to ensure 99% reflectivity; if more than 500 nm is deposited, this can then be selectively processed by means such as magnetorheological finishing, selective mechanical polishing, or ion beam figuring to achieve a potential lambda/2 form error or better while still leaving a high reflectivity Au layer of thickness above, for example, 200 nm. This is a useful technique for making small improvements to form errors in the diamond support substrate. The roughness of the Au coating may also be improved compared to the underlying diamond support plate by some combination of a thicker coating than is optically necessary, and/or high quality layer deposition and/or post deposition processing to produce improved optical properties. As such, using this approach it is possible to provide a reflective coating which has a surface roughness which is lower than that of the support plate and or a reflective coating having a surface profile with a root mean square deviation from a smooth target profile which is lower than that of the support plate.

With a flat, reflective, smooth, metal layer disposed on an underlying diamond support substrate, a dielectric coating may be added. The dielectric coating can have a dual role of protecting the metal surface from environmental degradation, especially for Ag under layers, and of improving the reflectance to at least 99% and potentially at least 99.2%, 99.4%, 99.6%, 99.7%, or 99.8%. As such, preferably the reflective coating comprises at least one metal layer and one or more dielectric layers disposed over the metal layer, the or each dielectric layer having a thickness equal to one quarter of the operational wavelength of the mirror. For example, the reflective coating may comprise a bonding layer, an optional barrier layer, a reflective metal layer, and one or more dielectric layers.

The one or more layers of dielectric material may have a total thickness of no more than 20 μm, 15 μm, 10 μm, or 5 μm and no less than 0.5 μm, 1 μm, or 2 μm. While some heat will be generated in the dielectric layers most of the heat will be generated in the reflective metal layer and so the dielectric layers can be made somewhat thicker than the reflective metal layer while retaining good heat spreading performance within the mirror. The one or more layers of dielectric material are formed from one or more of $ThF_4$, $YbF_3$, $BaF_2$, ZnSe, and/or ZnS.

Dielectric structures which are suitable for applications at around 10 micrometers operational wavelength include quarter wavelength stacks of ThF4 and ZnSe pairs or ZnS and Ge pairs, as discussed by Plass and co-workers (Laser Damage Studies of Metal Mirrors and ZnSe Optics by Long Pulse and TEA CO, Lasers at 10.6 μm, W Plass, R Krupka, A Giessen, H E Reedy, M Kennedy and D Ristau: Proc SPIE Vol 2114 (1994)). U.S. Pat. No. 6,020,992 also discloses various materials for fabricating optical stacked structures. Even though these are primarily disclosed in U.S. Pat. No. 6,020,992 for use as antireflective coatings, the same materials can also be used for highly reflective coatings with suitable layer structures.

A dielectric layer disposed on the reflective metal layer may be formed of a low index fluoride, e.g. ThF4, BaF2, or YbF3. Where more than one dielectric layer is provided, a first layer may be formed of a low index fluoride and a second layer may be formed of ZnS, ZnSe or Ge. Multiple stacked pairs of dielectric layers may be provided, e.g. 1, 2, 3, or 4 pairs of layers within 2 pairs being preferred.

More of these quarter wavelength pairs theoretically results in a higher reflectance percentage, but often this is offset by increased roughness and damage within the coating, leading to poorer optical performance due to increased scatter, lower damage threshold, a deviation from theoretical reflectance, or some combination of the above. Furthermore, as previously indicated, increasing the thickness of the reflective coating can lead to a decrease in thermal performance.

Final Mirror Configurations

The methodology as described herein can be applied to fabricate a number of different mirror configurations which have high reflectivity, sufficient mechanical strength, and good thermal performance to achieve, for example, high laser induced damage thresholds for high power optical applications.

FIG. 1 illustrates a mirror configuration based on a free-standing polycrystalline CVD diamond support plate. The mirror configuration comprises a polycrystalline CVD diamond support plate 2 which is approximately 0.8 mm thick. The polycrystalline CVD diamond layer 2 has a surface 4 which is processed to a high degree of flatness and low surface roughness. Furthermore, the diamond material which forms the surface 4 comprises a low concentration of non-diamond sp2 carbon, a low concentration of voids, a low concentration of surface and sub-surface crystal damage, and thus provides a diamond surface which has a high thermal conductivity.

A titanium bonding layer 6 is disposed on, and bonded to, the surface 4 of the polycrystalline CVD diamond support plate 2. The titanium bonding layer 6 is 50-250 nm in thickness and may be deposited by either an energetic method such as magnetron sputtering, or by a less energetic method such as evaporation, followed by an anneal cycle at a sufficiently high temperature to cause a bonding reaction with the surface 4 of the polycrystalline CVD diamond support plate 2.

An optional barrier layer 8 of, for example, platinum having a thickness in the range 0-250 nm is deposited on the titanium bonding layer 6. A metallic reflective coating 10 of Au or Ag having a thickness of approximately 200 nm is deposited over the bonding layer 6 and optional barrier layer 8. Finally, a dielectric stack 12 is formed over the metallic reflective coating. The dielectric stack may comprise two pairs of lambda/4 dielectric layers. Suitable materials for use in the dielectric stack include combinations of ThF$_4$, YbF$_3$, BaF$_2$, ZnSe, and/or ZnS.

FIG. 2 illustrates another mirror configuration based on a polycrystalline CVD diamond coated support plate. The mirror configuration comprises a support plate formed of a non-diamond support substrate 20 with a relatively thin coating (e.g. approximately 100 micrometers thick) of a polycrystalline CVD diamond 22 disposed on the non-diamond support substrate 20. The non-diamond support substrate 20 may be formed of silicon carbide, silicon, thermal pyrolytic graphite (TPG), or silicon cemented diamond (ScD). As in the previously described example, the polycrystalline CVD diamond comprises a surface 26 which is processed to a high degree of flatness and low surface roughness. Furthermore, the diamond material which forms the surface 26 comprises a low concentration of non-diamond sp2 carbon, a low concentration of voids, a low concentration of surface and sub-surface crystal damage, and thus provides a diamond surface which has a high thermal conductivity.

The support plate is then coated as illustrated in FIG. 1 to comprise a titanium bonding layer 28, an optional platinum barrier layer 30, a metallic reflective layer 32 of Au or Ag, and a dielectric stack 34.

FIG. 3 illustrates another mirror configuration based on a composite diamond support plate 36. The composite support plate 36 comprises diamond crystals 38 embedded in a non-diamond support material 40. The diamond composite support plate may be formed of silicon cemented diamond (ScD) which has good thermal characteristics while also being more easily formable into large areas and three-dimensional shapes when compared with a polycrystalline CVD diamond substrate. The diamond composite support plate 36 comprises a surface which has been processed to a high degree of flatness and low surface roughness. The support plate is then coated in a similar manner as illustrated in FIG. 1 to comprise a bonding layer 42, an optional platinum barrier layer 44, a metallic reflective layer 46 of Au or Ag, and dielectric stack 48.

Figure 4:
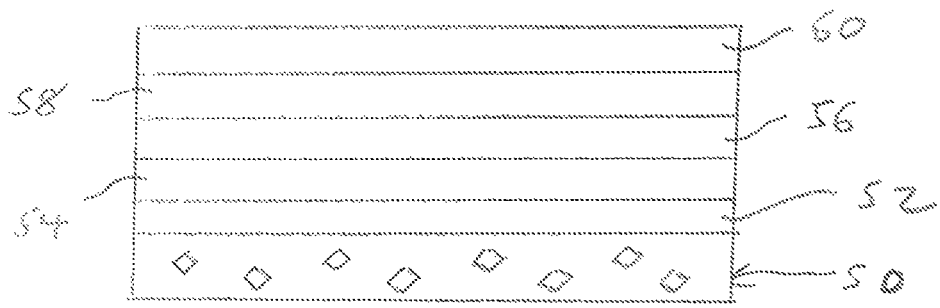
FIG. 4 shows a schematic diagram of yet another embodiment of a diamond-based high power laser mirror structure.

FIG. 4 illustrates another mirror configuration based on a composite diamond support plate 50 on which a thin polycrystalline CVD diamond coating 52 has been fabricated. The composite diamond support plate 50 may be formed of ScD as previously described and illustrated in FIG. 3. ScD coated with polycrystalline CVD diamond material has previously been proposed as a heat spreader for electronic device substrates (see, for example, WO2004/034466). Here it is proposed that such a composite material structure is polished to a precise optical finish and coated with a reflective coating to form a mirror suitable for high power laser applications. The support plate may be coated in a similar manner to the previous examples to comprise a titanium bonding layer 54, an optional platinum barrier layer 56, a metallic reflective layer 58 of Au or Ag, and dielectric stack 60.

The aforementioned mirror materials and configurations can provide high power laser mirrors with high reflectivity and high laser induced damage thresholds. For example, such mirrors can have a reflectivity of at least 99%, 99.2%, 99.4%, 99.6%, 99.7%, or 99.8% at an operational wavelength of the mirror and preferably a laser induced damage threshold meeting one or both of the following characteristics:

the laser induced damage threshold is at least 1 Jcm$^{-2}$, 2 Jcm$^{-2}$, 5 Jcm$^{-2}$, 10 Jcm$^{-2}$, 20 Jcm$^{-2}$, 30 Jcm$^{-2}$, 50 Jcm$^{-2}$, 75 Jcm$^{-2}$, 100 Jcm$^{-2}$, 150 Jcm$^{-2}$, or 200 Jcm$^{-2}$ measured using a pulsed laser at said operational wavelength with a pulse duration of 100 ns and a pulse repetition frequency in a range 1 to 10 Hz; and the laser induced damage threshold is at least 1 MW/cm$^2$, 5 MW/cm$^2$, 10 MW/cm$^2$, 20 MW/cm$^2$, 30 MW/cm$^2$, or 50 MW/cm$^2$ measured using a continuous wave laser at said operational wavelength.

High Power Optical Applications

Diamond mirrors as described herein are suitable for use in high power optical systems due to their high laser induced damage threshold at an operating wavelength in the infrared, visible, and/or ultraviolet region of the electromagnetic spectrum and their thermal stability resulting in significantly reduced thermal lensing when compared with non-diamond alternatives. As such, according to another aspect of the present invention there is provided an optical system as illustrated in FIG. 5 comprising:

a mirror 62 as described herein; and a light source 64 (e.g. a laser) configured to generate light 66 at a power of at least 20 kW, 25 kW, 30 kW, 35 kW, 40 kW, 45 kW, or 50 kW as either continuous wave or pulsed power and transmit said light towards the mirror 62 at an operating wavelength in the infrared, visible, or ultraviolet region of the electromagnetic spectrum.

The operational wavelength may be, for example, 10.6 µm, 1.06 µm, 532 nm, 355 nm, or 266 nm with a wavelength of 10.6 µm being particularly common for many high power industrial laser applications.

In relation to the above, it will be noted that the operating power of the described optical system is significantly lower than a continuous wave laser induced damage threshold of 1 MW/cm$^2$. However, it should be noted that to provide an optical element that has a long operating lifetime the laser induced damage threshold of the optical element should be significantly higher than the operating power of the optical system.

Benefits of diamond mirror configurations as described herein can even be realised for lower mean power densities in use, such as in a range 0.2 kW/cm$^2$ to 10 kW/cm$^2$. These mean power densities can cause reflected wavefront distortion in existing systems due to the relatively poor performance of existing materials compared to diamond solutions. Even though these are relatively low mean power levels, the spatial peak of the time averaged power density can be at least one order of magnitude greater, due to for example Gaussian beam profiles (rather than "top hat" beam profiles) being propagated through the system. The peak instantaneous power densities can be orders of magnitude higher still due to the power being delivered as a train of pulses at many kHz, with the ratio of "off" time to "on" time being typically between 10:1 and 1000:1. As such, even if laser induced damage is not an issue the quality of the reflected wavefront can still be adversely affected using conventional mirror materials and in this case diamond based configuration can still be advantageous. Further still, dynamic laser mirror systems in which the reflective optics are required to move also find benefits in using diamond mirror configurations due to their lighter weight and higher rigidity making them easier to move in a precise manner without any distortion.

The diamond-based mirror 62 as illustrated in FIG. 5 can also be mounted and cooled within the optical system to manage heat absorbed within the mirror. For example, a heat sink 68 can be provided in thermal contact with the mirror 62, e.g. via a rear surface of the mirror or around a peripheral edge of the mirror. Such a mirror assembly can be fluid cooled to further manage heat absorbed within the mirror in use.

In summary, it is believed that mirrors as described herein comprise a key combination of parameters for diamond mirrors in high power laser systems. As such, the present invention is considered to be an enabling technology for high power laser systems which require mirror structures.

While this invention has been particularly shown and described with reference to embodiments, it will be understood to those skilled in the art that various changes in form and detail may be made without departing from the scope of the invention as defined by the appending claims.

The invention claimed is:

1. A mirror for use in high power optical applications, the mirror comprising:
   a support plate comprising a synthetic diamond material; and
   a reflective coating disposed over the support plate,
   wherein the reflective coating comprises a bonding layer of carbide forming material selected from any of W, Cr, or Ti, which bonds the reflective coating to the synthetic diamond material in the support plate, a reflective metal layer disposed over the bonding layer, and one or more layers of dielectric material disposed over the reflective metal layer,
   wherein the bonding layer and the reflective metal layer together have a total thickness in a range 50 nm to 10 µm with the reflective metal layer having a thickness of no more than 5 µm, and
   wherein the support plate and the reflective coating are configured such that the mirror has a reflectivity of at least 99% at an operational wavelength of the mirror,
   wherein the bonding layer and the reflective metal layer are formed of different materials, and
   wherein the operational wavelength is one of 10.6 µm, 1.06 µm, 532 nm, 355 nm, or 266 nm.

2. A mirror according to claim 1,
   wherein the thickness of the reflective metal layer is no more than 3 µm, 1 µm, 500 nm, or 300 nm.

3. A mirror according to claim 1,
   wherein the thickness of the reflective metal layer is no less than 50 nm, 100 nm, 150 nm, or 200 nm.

4. A mirror according to claim 1,
   wherein the reflective metal layer is formed of Au, Ag, Al, Mo, Cu, Ni, Rh, or W.

5. A mirror according to claim 1,
   wherein the bonding layer has a thickness of no more than 500 nm, 250 nm, 150 nm, or 100 nm.

6. A mirror according to claim 5,
   wherein the thickness of the bonding layer is no less than 10 nm, 20 nm, or 50 nm.

7. A mirror according to claim 1,
   wherein the one or more layers of dielectric material have a total thickness of no more than 20 µm, 15 µm, 10 µm, or 5 µm.

8. A mirror according to claim 7,
   wherein the total thickness of the one or more layers of dielectric material is no less than 0.5 µm, 1 µm, or 2 µm.

9. A mirror according to claim 1,
   wherein the one or more layers of dielectric material comprise a stack of two or more dielectric layers disposed over the reflective metal layer, each dielectric layer having a thickness equal to one quarter of the operational wavelength of the mirror.

10. A mirror according to claim 1,
    wherein the one or more layers of dielectric material are formed from one or more of $ThF_4$, $YbF_3$, $BaF_2$, ZnSe, and/or ZnS.

11. A mirror according to claim 1,
    wherein the reflective coating further comprises a barrier layer provided between the bonding layer and the reflective metal layer.

12. A mirror according to claim 11,
    wherein the barrier layer has a thickness of no more than 500 nm, 250 nm, 150 nm, or 100 nm.

13. A mirror according to claim 12,
    wherein the barrier layer is formed of platinum.

* * * * *